United States Patent
Kim et al.

(10) Patent No.: US 12,266,379 B2
(45) Date of Patent: Apr. 1, 2025

(54) RELAXED INSTANCE FREQUENCY NORMALIZATION FOR NEURAL-NETWORK-BASED AUDIO PROCESSING

(71) Applicant: QUALCOMM Incorporated, San Diego, CA (US)

(72) Inventors: Byeonggeun Kim, Seoul (KR); Seunghan Yang, Incheon (KR); Hyunsin Park, Gwangmyeong (KR); Juntae Lee, Seoul (KR); Simyung Chang, Suwon (KR)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/937,765

(22) Filed: Oct. 3, 2022

(65) Prior Publication Data
US 2023/0119791 A1    Apr. 20, 2023

Related U.S. Application Data

(60) Provisional application No. 63/252,100, filed on Oct. 4, 2021.

(51) Int. Cl.
| | |
|---|---|
| *G10L 21/034* | (2013.01) |
| *G10L 17/04* | (2013.01) |
| *G10L 17/18* | (2013.01) |
| *G10L 25/30* | (2013.01) |
| *G10L 25/51* | (2013.01) |

(52) U.S. Cl.
CPC ............ *G10L 21/034* (2013.01); *G10L 17/04* (2013.01); *G10L 17/18* (2013.01); *G10L 25/30* (2013.01); *G10L 25/51* (2013.01)

(58) Field of Classification Search
CPC ....... G10L 21/034; G10L 17/04; G10L 17/18; G10L 25/30; G10L 25/51; G06N 3/09; G06N 3/0464
See application file for complete search history.

(56) References Cited

U.S. PATENT DOCUMENTS

| | | | |
|---|---|---|---|
| 2014/0201126 A1* | 7/2014 | Zadeh | A61B 5/165 706/52 |
| 2016/0217368 A1 | 7/2016 | Ioffe et al. | |
| 2019/0066713 A1* | 2/2019 | Mesgarani | G10L 25/30 |
| 2020/0043518 A1* | 2/2020 | Jansson | G06N 3/045 |

(Continued)

OTHER PUBLICATIONS

Ba J.L., et al., "Layer Normalization", arXiv: 1607.06450v1 [stat. ML], Jul. 21, 2016, pp. 1-14.

(Continued)

*Primary Examiner* — Michael N Opsasnick
(74) *Attorney, Agent, or Firm* — QUALCOMM Incorporated; Espartaco Diaz Hidalgo

(57) ABSTRACT

Techniques and apparatus for training a neural network to classify audio into one of a plurality of categories and using such a trained neural network. An example method generally includes receiving a data set including a plurality of audio samples. A relaxed feature-normalized data set is generated by normalizing each audio sample of the plurality of audio samples. A neural network is trained to classify audio into one of a plurality of categories based on the relaxed feature-normalized data set, and the trained neural network is deployed.

27 Claims, 11 Drawing Sheets

(56) References Cited

U.S. PATENT DOCUMENTS

| | | | | |
|---|---|---|---|---|
| 2020/0413142 | A1* | 12/2020 | Panchaksharaiah | G06V 20/41 |
| 2021/0390314 | A1* | 12/2021 | Baijal | G06N 3/045 |
| 2022/0374130 | A1* | 11/2022 | Pu | G06F 1/163 |
| 2023/0016242 | A1* | 1/2023 | Takahashi | G10L 25/30 |
| 2023/0119791 | A1* | 4/2023 | Kim | G10L 25/30 704/232 |

OTHER PUBLICATIONS

Bronskill J., et al., "Tasknorm: Rethinking Batch Normalization for Meta-Learning", Proceedings of the 37 th International Conference on Machine Learning, PMLR 119, 2020, 12 pages.

Choi S., et al., "Meta Batch-Instance Normalization for Generalizable Person Re-Identification", arXiv:2011.14670v2 [cs.CV], Mar. 29, 2021, pp. 1-14.

Huang X., et al., "Arbitrary Style Transfer in Real-time with Adaptive Instance Normalization", arXiv:1703.06868v2 [cs.CV], Jul. 30, 2017, 11 pages.

Ioffe S., et al., "Batch Normalization: Accelerating Deep Network Training by Reducing Internal Covariate Shift", International Conference on Machine Learning, Mar. 2, 2015, pp. 1-11, arXiv:1502.03167v3.

Li L., et al., "CN-Celeb: Multi-genre Speaker Recognition", arXiv:2012.12468v2 [cs.SD], Nov. 24, 2021, pp. 1-18.

Mart'in-Morat'o I., et al., "Low-complexity Acoustic Scene Classification for Multi-device Audio: Analysis of Dcase 2021 Challenge Systems", Detection and Classification of Acoustic Scenes and Events 2021, Nov. 15-19, 2021, 5 pages, arXiv:2105.13734v2 [eess.AS].

Nam H., et al., "Batch-Instance Normalization for Adaptively Style-Invariant Neural Networks", arXiv:1805.07925v3 [cs.CV], Apr. 25, 2019, pp. 1-12.

"Towards Robust Domain Generalization in 2D Neural Audio Processing", ICLR, 2022, pp. 1-18.

Ulyanov D., et al., "Instance Normalization: The Missing Ingredient for Fast Stylization", arXiv:1607.08022v3 [cs.CV], Nov. 6, 2017, pp. 1-6.

Warden P., et al., "Speech Commands: A Dataset for Limited-Vocabulary Speech Recognition," arXiv preprint arXiv:1804.03209v1 [cs.CL], Apr. 9, 2018, pp. 1-11.

Wu Y., et al., "Group Normalization", In ECCV (13), vol. 11217, arXiv:1803.08494v3 [cs.CV], Jun. 11, 2018, pp. 1-10.

Chang S., et al., "Subspectral Normalization for Neural Audio Data Processing", ICASSP 2021—2021 IEEE International Conference on Acoustics, Speech and Signal Processing (ICASSP), IEEE, Jun. 6, 2021, pp. 850-854, XP033955128, DOI:10.1109/ICASSP39728.2021.9413522 [retrieved on Apr. 22, 2021], Abstract p. 850, Left-hand Column, Line 1—p. 853, Right-hand Column, Last Line, Section 4.1, 3.1—Equations 2, 3, 4, 5, 3.2.

International Search Report and Written Opinion—PCT/US2022/077496—ISA/EPO—Jan. 4, 2023.

* cited by examiner

RELAXED INSTANCE FREQUENCY NORMALIZATION FOR NEURAL-NETWORK-BASED AUDIO PROCESSING

CROSS-REFERENCE TO RELATED APPLICATIONS

This application claims priority to and benefit of U.S. Provisional Application Ser. No. 63/252,100, filed Oct. 4, 2021, entitled "Relaxed Instance Frequency Normalization for Neural Network-based Audio Processing," and assigned to the assignee hereof, which is hereby incorporated by reference herein in its entirety.

INTRODUCTION

Aspects of the present disclosure relate to using artificial neural networks to process audio content.

Artificial neural networks can be used for various tasks, such as classifying content. For example, in visual content, artificial neural networks can be used to extract information from various domains within the visual content, such as the spatial, color, and temporal domains, to perform various tasks with respect to the visual content. Generally, visual content may be represented as at least a two-dimensional space with a horizontal axis and a vertical axis. Additional axes may be added to represent other dimensions, such as a depth (Z) axis in three-dimensional imaging or a temporal axis in video content. The artificial neural networks used in image-based processing tasks may include, for example, two-dimensional convolutional neural networks used to process individual images or individual frames in video content. In these two-dimensional convolutional neural networks, two-dimensional portions of images (e.g., portions having a horizontal dimension and a vertical dimension) can be used in training the two-dimensional convolutional neural network and in performing inferences on an input image.

Artificial neural networks can also be used for various tasks with respect to audio data. For example, artificial neural networks can be used in audio scene (or environment) classification tasks to identify the ambient environment in which the audio data was captured. Artificial neural networks can be used in speaker identification tasks in which a speaker recorded in the audio data is identified. In yet another example, artificial neural networks can be used in keyword extraction tasks to identify particular words in a spoken utterance that are related to an action to be performed within an application, to a subject of a search query, or the like. Audio data generally may be represented in a two-dimensional space, in which a first dimension corresponds to a frequency dimension and a second dimension corresponds to a temporal dimension, allowing for two-dimensional convolutional neural networks to be used in various tasks with respect to audio data.

Convolutional neural networks for image data can convolve data along the horizontal and vertical spatial dimensions in the image data. Convolutional neural networks for audio data may involve processing data along the temporal and frequency dimensions instead of the horizontal and vertical spatial dimensions of image data, both of which may convey information that can be used in classifying data. However, statistically relevant information in audio data may be concentrated within the neural network. This concentration of statistical information in audio data may, thus, increase the difficulty of extracting usable information from audio data that can be used to perform various classification or other machine-learning-based tasks with respect to audio data.

Accordingly, what is needed are improved techniques for processing audio content using artificial neural networks.

BRIEF SUMMARY

Certain aspects of the present disclosure provide a method for training a neural network to classify audio into one of a plurality of categories. An example method generally includes receiving a data set including a plurality of audio samples. A relaxed feature-normalized data set is generated by normalizing each audio sample of the plurality of audio samples. A neural network is trained to classify audio into one of a plurality of categories based on the relaxed feature-normalized data set, and the trained neural network is deployed.

Certain aspects of the present disclosure provide a method for classifying audio using a neural network. An example method generally includes receiving an audio input. A relaxed feature-normalized version of the audio input is generated. A classification of the received audio input is generated using a neural network trained to classify audio into one of a plurality of categories and the relaxed feature-normalized version of the audio input. One or more actions are taken based on the classification of the received audio input.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The figures depict certain features of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
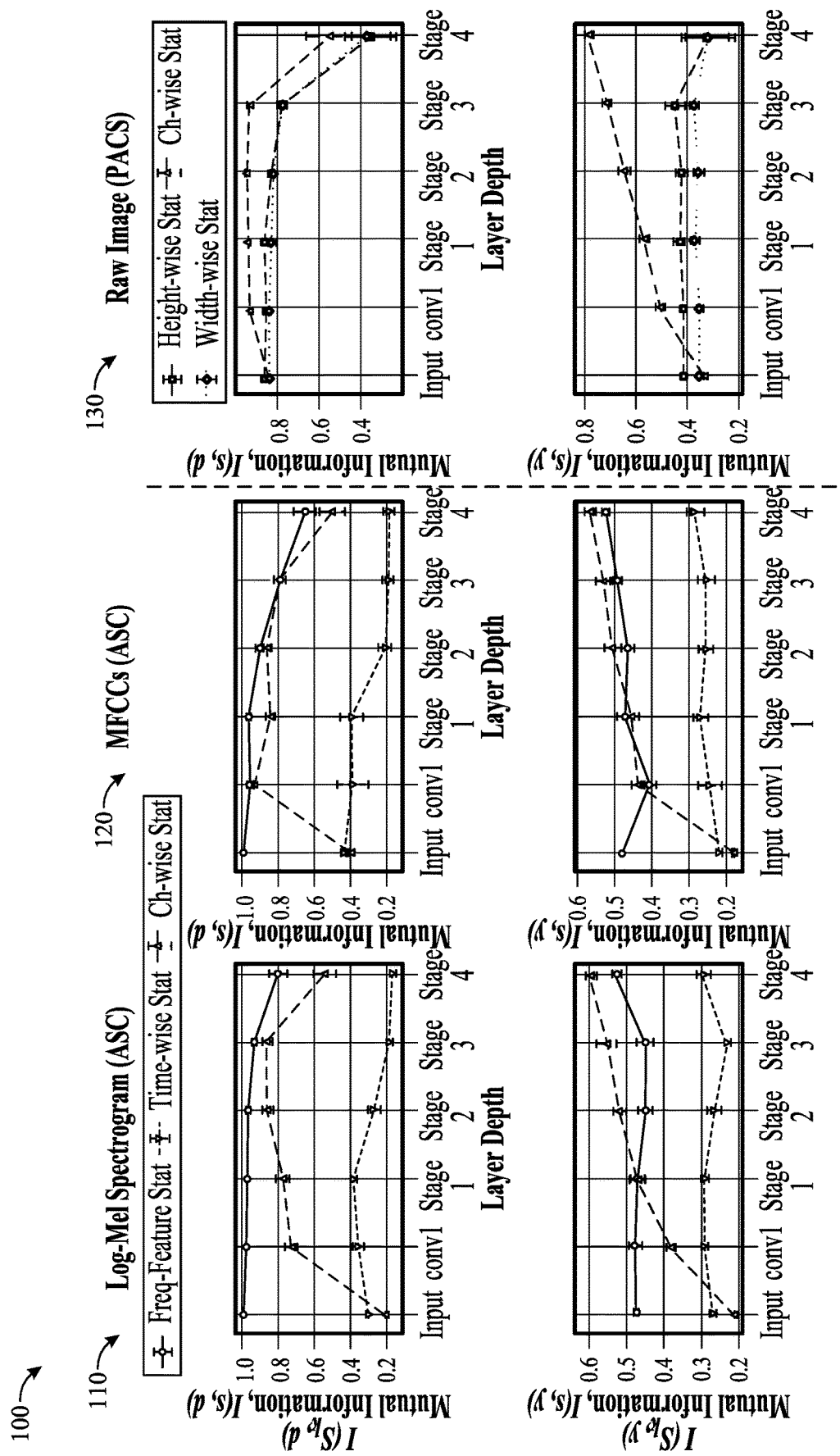
FIG. 1 depicts mutual information estimates for various representations of two-dimensional data.

Certain aspects of the present disclosure provide techniques for classifying audio data using neural networks.

Audio data may be represented as two-dimensional data including a frequency dimension and a temporal dimension. Because audio data may be represented as two-dimensional data, two-dimensional convolutional networks, similar to those used in image processing tasks, can be used to process audio data. However, audio data has different characteristics than image data, and thus, techniques used to pre-process image data may not result in a usable model for audio data. For example, where image data has a height and a width (spatial dimensions), audio data generally has frequency and temporal dimensions, and convolutions on the frequency and temporal dimensions in audio data may not allow for a model to generate usable inferences on audio data in the same way that convolutions on the height and width dimensions in image data would allow for the generation of usable inferences on image data.

Generally, neural networks can be trained using data from a single domain in order to generate inferences specific to that domain. For example, a neural network may be trained using video data captured from autonomous driving environments in order to generate usable inferences (e.g., object detection, subject pose prediction, etc.) in that domain. However, a neural network trained using a domain-specific training data set may generate usable inferences only for data within that domain, but may not be able to generate usable inferences for data outside of that domain. In another example, for audio data, a neural network can be trained using data captured by specific capture devices or in specific environments, which may allow for usable inferences to be generated for inputs generated by those specific capture devices or in those specific environments, but may not allow usable inferences to be generated for inputs generated by other capture devices or other environments.

To train a neural network to generate usable inferences in data from various domains, domain generalization can be used to eliminate or reduce instance-specific domain discrepancies in data used to train a neural network, and thus, to generalize a neural network to understand data from unseen domains. Generally, in image data, domain generalization may be achieved through various normalization techniques, over the spatial aspects of the image data. However, while convolutions over the spatial aspects of image data may allow for some degree of domain generalization in neural networks used for image data, such convolutions may not result in domain generalization in neural networks used for audio data. For example, audio data may be convolved over the frequency and temporal dimensions. However, both the frequency and temporal dimensions in audio data may include domain-relevant information, and domain-specific, task-agnostic information may not be distributed over different dimensions in the audio data. Thus, while audio signals may be represented by two-dimensional images (e.g., log-Mel spectrograms, or Mel frequency cepstral coefficient (MFCC) representations), training machine learning models to perform tasks on audio data based on these two-dimensional images using convolutions over different spatial dimensions in these images may not result in a neural network that can understand data from unseen domains.

Aspects of the present disclosure provide techniques that allow for audio classification tasks using neural networks that generalize audio data using relaxed frequency normalization techniques. As used herein, relaxed frequency normalization generally allows for domain generalization for audio data while normalizing audio data in the frequency domain with additional normalization applied to relax the loss of discriminative information in other forms of normalization. By using relaxed frequency normalization of audio data used for training a neural network and performing inferences on an audio input, neural networks can leverage domain-relevant information carried in the frequency domain to allow for domain generalization for audio tasks. Thus, a neural network may be trained on a set of audio data including samples from a plurality of domains, and the resulting neural network may be domain generalized and may allow for the classification of audio data into known and previously unseen domains (e.g., using domain-invariant features generated for audio data). This may allow for a neural network to more accurately classify audio data, which may allow for audio data to be classified without needing to fall back to other models or other classification techniques and without performing extraneous operations based on inaccurate classifications of audio data. Thus, fewer compute resources may be utilized to classify audio data and perform resulting tasks based on a classification of the audio data, which may reduce the amount of power consumed by computing devices to perform these tasks and accelerate processing of audio data, relative to the amount of power and time used when a neural network is not trained using relaxed frequency normalization techniques.

Example Characteristics of Audio Data in Two-Dimensional Convolutional Neural Networks FIG. 1 illustrates mutual information estimates 100 for various representations of two-dimensional data. As illustrated, estimates 100 include estimates of mutual information for audio data represented as log-Mel spectrograms in graph 110, for audio data represented as Mel frequency cepstral coefficient (MFCC) representations in graph 120, and for raw image data in graph 130. These are estimates of mutual information between dimension-wise statistics of intermediate hidden features and the domain label, I(s, d) (top), or the class label, I(s, y) (bottom). Graph 130 uses a raw RGB image for the PACS dataset (including Photo, Art Painting, Cartoon, and Sketch images) and averages over five seeds, where an error bar stands for standard deviation.

Generally, mutual information refers to a measure of mutual dependence between two variables on each other. To estimate mutual information—and to identify which dimensions include domain-relevant information—dimension-wise statistics of hidden features for each dimension can be calculated. To calculate these statistics, a hidden feature x in a data channel with an index i may be denoted, where index i specifies indices in each of a plurality of axes. In one example, these axes may include a batch axis (designated as N), a channel axis (designated as C) a frequency axis (designated as F, and similar to a height dimension in image data), and a temporal axis (designated as T, and similar to a width dimension in image data). Thus, an index i may be represented as $i=(i_N,i_C,i_F,i_T)$, where $i_N$ represents an index on the batch axis, $i_C$ represents an index on the channel axis, $i_F$ represents an index on the frequency axis, and $i_T$ represents an index on the temporal axis. In another example, dimension statistics, including statistics along each of a plurality of dimensions, for a hidden feature $x \in \mathbb{R}^{C \times F \times T}$ may be calculated. A frequency-wise statistic may be a concatenation of mean and standard deviation along the F axis (e.g., the frequency dimension in two-dimensional audio represented by frequency and time dimensions), such that $s^{(F)} = \text{concat}(\mu^{(F)}, \sigma^{(F)})$.

For each instance of data in a batch of data, statistical measurements, such as mean and standard deviation, may be calculated. A frequency-wise mean, for example, may be calculated according to the equation:

$$\mu_i^F = \frac{1}{m} \sum_{k \in \mathbb{S}_i} x_k \tag{1}$$

A frequency-wise standard deviation may be calculated according to the equation:

$$\sigma_i^F = \sqrt{\frac{1}{m} \sum_{k \in \mathbb{S}_i} (x_k - \mu_i)^2 + \epsilon} \tag{2}$$

where $\epsilon$ represents a small constant, $\mathbb{S}_i = \{k | k_F = i_F\}$ where k represents a sample in a data set, m is the size of $\mathbb{S}_i$, and $i_F$ and $k_F$ represent sub-indices of three-dimensional indices i and k along the F axis. Statistics for the N, C, and T axes (e.g., the batch, channel, and temporal dimensions, respectively) may be similarly calculated. It should be noted that in image data, the axes over which statistics are calculated for a hidden feature x may include a height dimension H instead of a frequency dimension F and a width dimension W instead of a temporal dimension T. As shown in FIG. 1, for the graph 130, channel statistics yield higher values than width or height-wise ones. However, frequency statistics may also be highly correlated to class label y in the audio domain.

To generate the mutual information estimate illustrated in graph 130 for image data, a residual neural network trained on a multi-domain image data set may be used. For the mutual information estimates illustrated in graphs 110 and 120, a training data set for multi-device acoustic scene classification (ASC) can be used. In this ASC data set, a plurality of acoustic scenes (e.g., shopping malls, airports, mass rail transit stations, etc.), recorded by a plurality of devices.

Graphs 110, 120, and 130 illustrate mutual information estimates for each of a plurality of stages in a neural network. As illustrated in graph 130, for raw image data, a mutual information estimate for a hidden feature in the channel dimension may be higher than mutual information estimates for the height and width dimensions at each stage of the neural network. Thus, for image data, the channel dimension can represent domain information in image-based two dimensional convolutional neural networks, and normalization along the channel domain can be used for domain generalization. However, for audio data, as illustrated in graphs 110 and 120, mutual information estimates may be highest in the frequency dimension, and may be lowest in the temporal dimension. Thus, for audio data, it may be seen that domain-specific information dominates in the frequency dimension rather than the channel dimension.

Because domain information is dominant in the frequency dimension, domain generalization for audio data may be achieved by normalizing data along the frequency domain. By doing so, extraneous domain-specific information may be suppressed, and task-relevant information may be preserved in the frequency dimension.

Example Relaxed Instance Frequency Normalization in Audio Data

To generalize a neural network used in audio classification tasks, aspects of the present disclosure provide techniques for normalizing audio data in the frequency domain.

Various types of normalizations can be used to suppress extraneous domain-specific information and allow for task-relevant information to be preserved in data used in training neural networks and in performing inferences using these neural networks. Batch normalization may be one technique used in normalizing data. In batch normalization, statistical measurements (e.g., mean and standard deviation) may be calculated for each of a plurality of channels across each sample in a training data set and across spatial dimensions. In instance normalization, statistical measurements may be calculated for individual channels and for each sample across spatial dimensions. Still another normalization technique used to normalize training data and an input against which an inference is to be generated may include group normalization, in which channels are divided into groups, and each group is normalized using statistical measurements generated for that group.

More generally, given a hidden feature x with a four dimensional index $i=(i_N,i_C,i_F,i_T)$, an element of a normalized feature may be represented by the equation $$\hat{x}_i = \frac{x_i - \mu_i}{\sigma_i}.$$

In this equation, C, F, and T correspond to batch, channel, frequency (height), and time (width) axes, respectively. As discussed above, the mean $\mu_i$ and standard deviation $\sigma_i$ measurements may be calculated over a set $\mathbb{S}_i$ whose size may be defined as $|\mathbb{S}_i|=m$. Channel normalization may thus be defined as a feature normalization where feature elements having a same channel index $i_C$ share mean and variance, such that batch normalization is defined by $$S_i = \{k | k_C = i_C\} = \{k | k = (:,i_C,:,:)\} \tag{3}$$

and is performed based on the above equations over a data set including feature elements having the same channel index. In the equations above, $i_C(k_C)$ represents a sub-index of i(k) along the C axis. Meanwhile, feature normalization (FN) may be defined as an approach where feature elements sharing the same frequency feature index f in the four-dimensional space are normalized together. Batch frequency normalization (BFN), instance frequency normalization (IFN), and group frequency normalization (GFN) can be defined. BFN may be defined by the equation $$\mathbb{S}_i = \{k | k_F = i_F\} = \{k | k = (:,:,i_F,:)\} \qquad (4)$$

where $i_F(k_F)$ is a sub-index of $i(k)$ along the frequency (F) axis. IFN may be defined according to the equation:

$$\mathbb{S}_i = \{k | k = (i_N,:,i_F,:)\} \qquad (5)$$

IFN generally allows for the reduction or elimination of instance-specific domain data in audio features. It should be noted, however, that frequency statistics generally have a high correlation to domain information and class-discriminative information. Because frequency statistics are highly correlated to class-discriminative information using IFN to normalize audio data may cause the loss of discriminative information that may be useful in classifying audio inputs. Thus, to allow for domain generalization for audio data while normalizing audio data in the frequency domain, an additional normalization can be used to relax, or alleviate, the loss of discriminative information in IFN. To relax IFN, instance-wise global statistics over the N dimension may be generated and used in layer normalization techniques. These instance-wise global statistics over the N dimension may be represented by the equation $\mathbb{S}_i = \{k | k = (i_N,:,:):\}$. Using IFN and LN, relaxed instance frequency normalization (RFN) may be represented by the equation:

$$RFN(x) = \lambda \cdot LN(x) + (1-\lambda) \cdot IFN(x) \qquad (6)$$

where x is an input into an RFN module in a neural network, and $\lambda \in [0,1]$. Generally, the $\lambda$ term represents a degree of relaxation, where larger values of $\lambda$ correspond to larger amounts of relaxation of an instance-frequency-normalized value of an input x, and smaller values of $\lambda$ correspond to smaller amounts of relaxation of an instance-frequency-normalized value of an input x. Generally, RFN need not use affine transformations, which may reduce the number of regularization parameters in the network. Further, RFN can discard unnecessary (or superfluous) domain information while reducing the loss of discriminative information. In RFN, the resulting mean statistical measure may be represented by the equation:

$$\mu'_{n,f} = \frac{\lambda}{\sigma_n}(\mu_{n,f} - \mu_n) \qquad (7)$$

where $\lambda$ represents the degree of relaxation, $\mu_{n,f}$ represents an average over the batch and frequency dimensions, $U_n$ represents an average over the batch dimension, and $\sigma_n$ represents a standard deviation over the batch dimension. In some aspects, $\lambda=0$ results in $RFN(x)=IFN(x)$, while $\lambda=1$ results in $RFN(x)=LN(x)$.

Meanwhile, the resulting standard deviation statistical measure in RFN may be represented by the equation:

$$\sigma'_{n,f} = \lambda \cdot \frac{\sigma_{n,f}}{\sigma_n} + (1-\lambda) \qquad (8)$$

where $\mu_{n,f}$ and $\sigma_{n,f}$ are calculated over $\mathbb{S}_i = \{k | k = (n,:,f,:)\}$, and $\mu_n$ and $\sigma_n$ are statistics over $\mathbb{S}_i = \{k | k = (n,:,:,:)\}$. When $\lambda=1$, $\mu_{n,f}'$ and $\sigma_{n,f}'$ correspond to the mean and standard deviation calculated for layer normalization, and when $\lambda=0$, $\mu_{n,f}'$ and $\sigma_{n,f}'$ correspond to the mean and standard deviation calculated for IFN.

Figure 2:
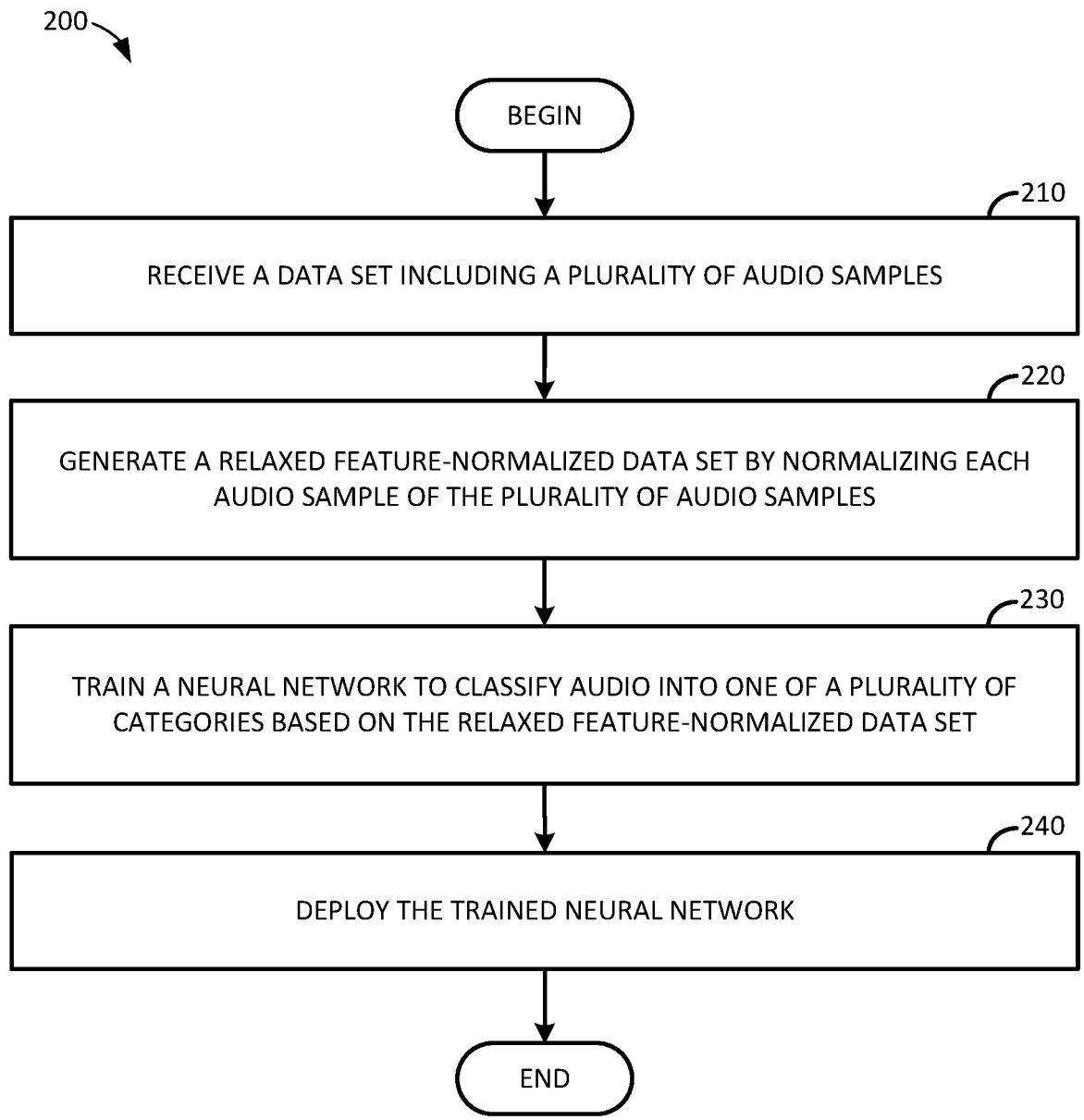
FIG. 2 depicts example operations for training a neural network to classify audio into one of a plurality of categories using relaxed frequency normalization of a training data set of audio data, according to aspects of the present disclosure.

FIG. 2 illustrates example operations 200 for training a neural network to classify audio into one of a plurality of categories using relaxed frequency normalization of a training data set of audio data, according to aspects of the present disclosure. Operations 200 may be performed, for example, by a computing device (such as processing system 900 illustrated in FIG. 9) on which neural network may be trained and which may deploy (e.g., to a server, to a user equipment (UE), or the like) the trained neural network for use in performing inferences on received audio data.

As illustrated, operations 200 may begin at block 210, where a data set including a plurality of audio samples is received. The data set of audio samples may include audio samples of varying lengths and associated with a plurality of categories. For example, for training a neural network for audio scene classification, the data set of audio samples may include samples from a plurality of different audio environments. Each sample in the data set may be labeled, or tagged, with an indication of the environment from which the sample was gathered. In another example, for training a neural network for keyword detection, the data set of audio samples may include a plurality of audio utterances, and each utterance may be associated with a keyword associated with that utterance. In still another example, for training a neural network for speaker detection, the data set of audio samples may include a plurality of audio utterances, and each utterance may be associated with the speaker who spoke the utterance.

At block 220, a relaxed feature-normalized data set is generated. Generally, the relaxed feature-normalized data set is generated by normalizing each audio sample of the plurality of audio samples. As discussed above, to normalize the audio samples in the received data set, the audio samples in the received data set may be normalized using instance frequency normalization (IFN), relaxed based on another type of normalization and a normalization factor $\lambda$. In some aspects, layer normalization (LN) may be used to relax IFN applied to the audio samples in the data set. In some examples, other types of normalizations, such as batch normalization, can be used to relax IFN applied to the audio samples in the data set. The choice of the type of normalization use to relax IFN applied to the audio samples in the data set may be a design choice selected based on the intended classification task for the audio data.

In some aspects, to generate the relaxed feature-normalized data set, one or more statistical measures may be calculated for one or more hidden features in a plurality of feature dimensions in the plurality of audio samples. These hidden features generally may correspond to features in a latent space that describe an audio sample and from which various correlations can be made in order to classify audio samples into one of a plurality of categories. The plurality of feature dimensions may include a batch dimension (designated N), a channel dimension (designated C), a frequency dimension (designated F and corresponding to a height dimension in image-based data sets), and a temporal dimension (designated T and corresponding to a width dimension in image-based data sets). In one example, calculating these statistical measures may include calculating a frequency-wise mean across the plurality of audio samples and a frequency-wise standard deviation across the plurality of audio samples. An instance-frequency-normalized version of each sample of the plurality of audio samples may be generated based on the calculated one or more statistical measures.

In some aspects, to generate the relaxed feature-normalized data set, the normalized audio samples of the plurality of audio samples may be further normalized. The normalized audio samples may be further normalized based on layer normalization or other normalization techniques based on statistical measures generated over the received data set. In layer normalization, for example, the statistical measures generated over the received data set may be a mean and standard deviation calculated over the batch dimension in the samples in the received data set.

In some aspects, further normalizing each audio sample of the plurality of audio samples may be further based on a relaxation factor. This relaxation factor may be associated with a degree of relaxation to apply to each instance-frequency-normalized audio sample of the plurality of audio samples. In some aspects, the relaxation factor may range from 0 to 1, where a relaxation factor of 0 corresponds to no relaxation of the image frequency normalization applied to the audio samples, while a relaxation factor 1 corresponds to a full relaxation of the instance frequency normalization applied to the audio samples in favor of a different form of normalization (e.g., layer normalization, batch normalization, etc.).

At block 230, a neural network is trained to classify data into one of a plurality of categories based on the relaxed feature-normalized data set.

At block 240, the trained neural network is deployed. The trained neural network may be deployed, for example, to one or more computing devices that can receive data from a mobile device (e.g., a user equipment in communication with these computing devices) and perform an inference with respect to an audio utterance received from the mobile device. In another example, the neural network may be deployed to a user equipment (UE) or other mobile device itself for use in performing inferences locally (e.g., without incurring network processing overheads involved in transmitting an audio recording to a remote device for further processing).

Figure 3:
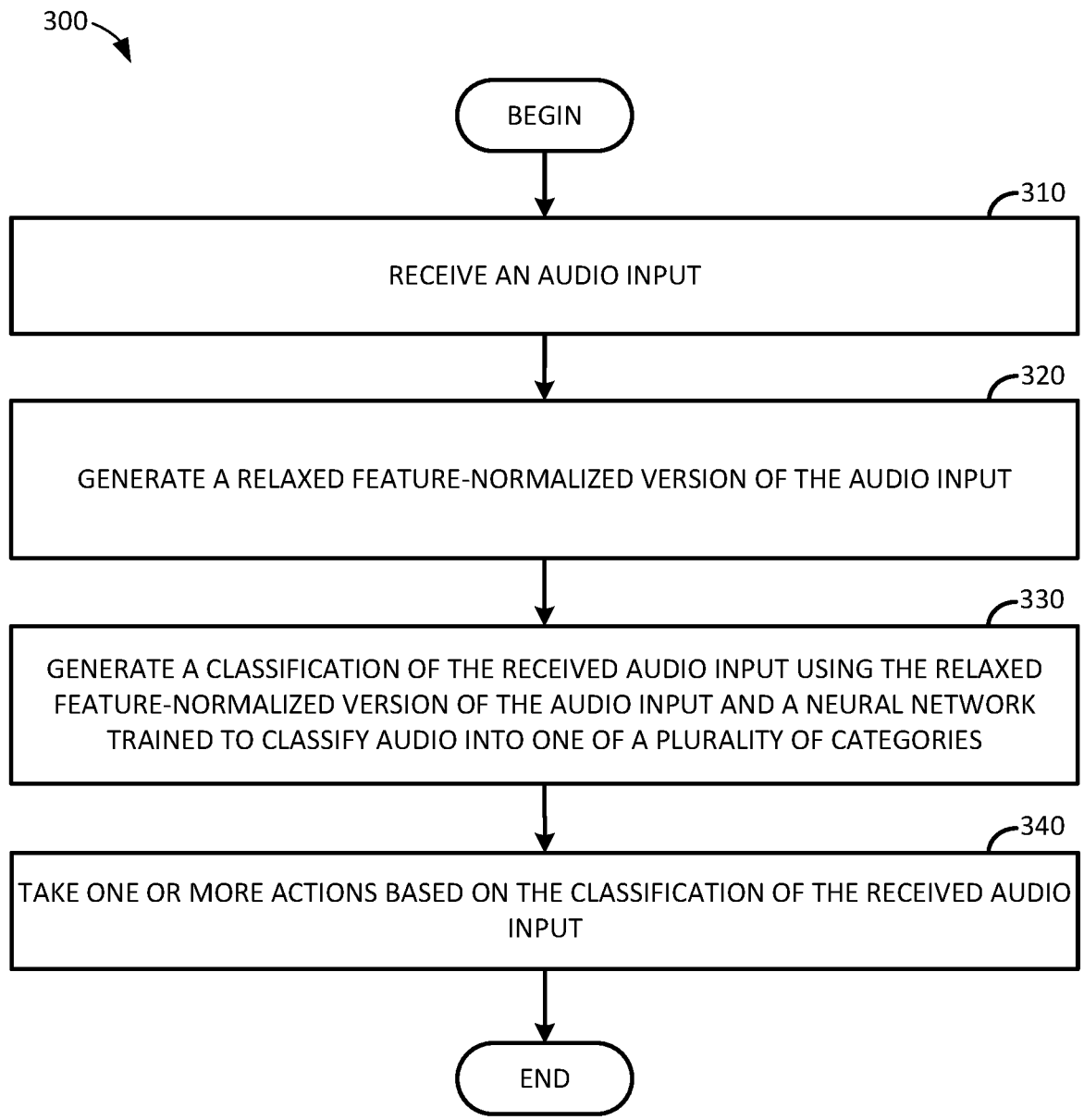
FIG. 3 depicts example operations for classifying audio into one of a plurality of categories based on relaxed frequency normalization of the audio using a neural network, according to aspects of the present disclosure.

FIG. 3 illustrates example operations 300 for classifying audio input one of a plurality of categories using a neural network and relaxed frequency normalization of the audio. Operations 300 may be performed, for example, by a computing device on which neural network may be deployed for use in performing inferences on received audio data. This computing device may include a server, cloud computing resources, one or more computing devices integral to or otherwise co-located with a network entity (e.g., a gNodeB, eNodeB, etc.) serving a user equipment in a wireless network, a user equipment (UE) or other device on which inferences can be generated locally, or the like.

As illustrated, operations 300 may begin at block 310, where an audio input is received for classification. Generally, the audio input may be generated using one or more audio recording devices located on a source device and provided (e.g., via a network connection or on a local communications bus between the audio recording devices and a processor on which inference generation operations may be performed).

At block 320, a relaxed feature-normalized version of the audio input may be generated. To normalize the audio input, the audio input in the received data set may be normalized using instance frequency normalization (IFN), relaxed based on another normalization and a normalization factor $\lambda$. In some aspects, layer normalization (LN) may be used to relax IFN applied to the audio input. In some examples, other normalizations, such as batch normalization, can be used to relax IFN applied to the input.

Similar to the generation of the relaxed feature-normalized version of the audio samples discussed above with respect to FIG. 2, to generate the relaxed feature-normalized version of the audio input, one or more statistical measures may be calculated from one or more hidden features in each of a plurality of feature dimensions in the received audio input. The plurality of feature dimensions may include a batch dimension (designated N), a channel dimension (designated C), a frequency dimension (designated F and corresponding to a height dimension in image data), and a temporal dimension (designated T and corresponding to a width dimension in image data). In one example, calculating these statistical measures may include calculating a frequency-wise mean across the received audio input and a frequency-wise standard deviation across the received audio input. An instance-frequency-normalized version of the received audio input may be generated based on the calculated one or more statistical measures.

In some aspects, to generate the relaxed feature-normalized version of the audio input, the normalized audio input may be further normalized. The normalized audio input may be further normalized based on layer normalization or other normalization techniques based on statistical measures generated over the received audio input. In layer normalization, for example, the statistical measures generated over the received audio input may be a mean and standard deviation calculated over the batch dimension in the samples in the received audio input.

In some aspects, further normalizing the received audio input may be further based on a relaxation factor. This relaxation factor may be associated with a degree of relaxation to apply to the instance-frequency-normalized audio input. In some aspects, the relaxation factor may range from 0 to 1, where a relaxation factor of 0 corresponds to no relaxation of the image frequency normalization applied to the audio input, while a relaxation factor 1 corresponds to a full relaxation of the instance frequency normalization applied to the audio input in favor of a different form of normalization (e.g., layer normalization, batch normalization, etc.).

At block 330, the received audio input is classified using the relaxed frequency-normalized version of the audio input and a neural network trained to classify audio into one of a plurality of categories. In some aspects, the neural network may include a plurality of layers. Any number of layers in the neural network may include a relaxed frequency normalization module that applies relaxed frequency normalization (e.g., instance frequency normalization, relaxed by another normalization technique such as layer normalization or batch normalization) to an input of the layer (e.g., a raw audio input provided to an initial layer of the neural network and/or representations of the raw audio input generated by a layer within the neural network).

At block 340, one or more actions are taken based on classifying the received audio input. In one example, where the neural network is used for audio scene classification tasks, the one or more actions may include identifying a noise cancellation mode to apply to an audio output. These noise cancellation modes may, for example, allow for environmental noise to be partially, but not fully, suppressed in some situations, but may filter environmental noise fully or near fully in other situations. In another example, where the neural network is used for keyword identification tasks, the one or more actions may include triggering one or more operations in a software application based on the identified keyword in a received audio input. In still another example, where the neural network is used for speaker identification tasks, the one or more actions may include performing speaker-specific actions on a computing system.

Figure 4:
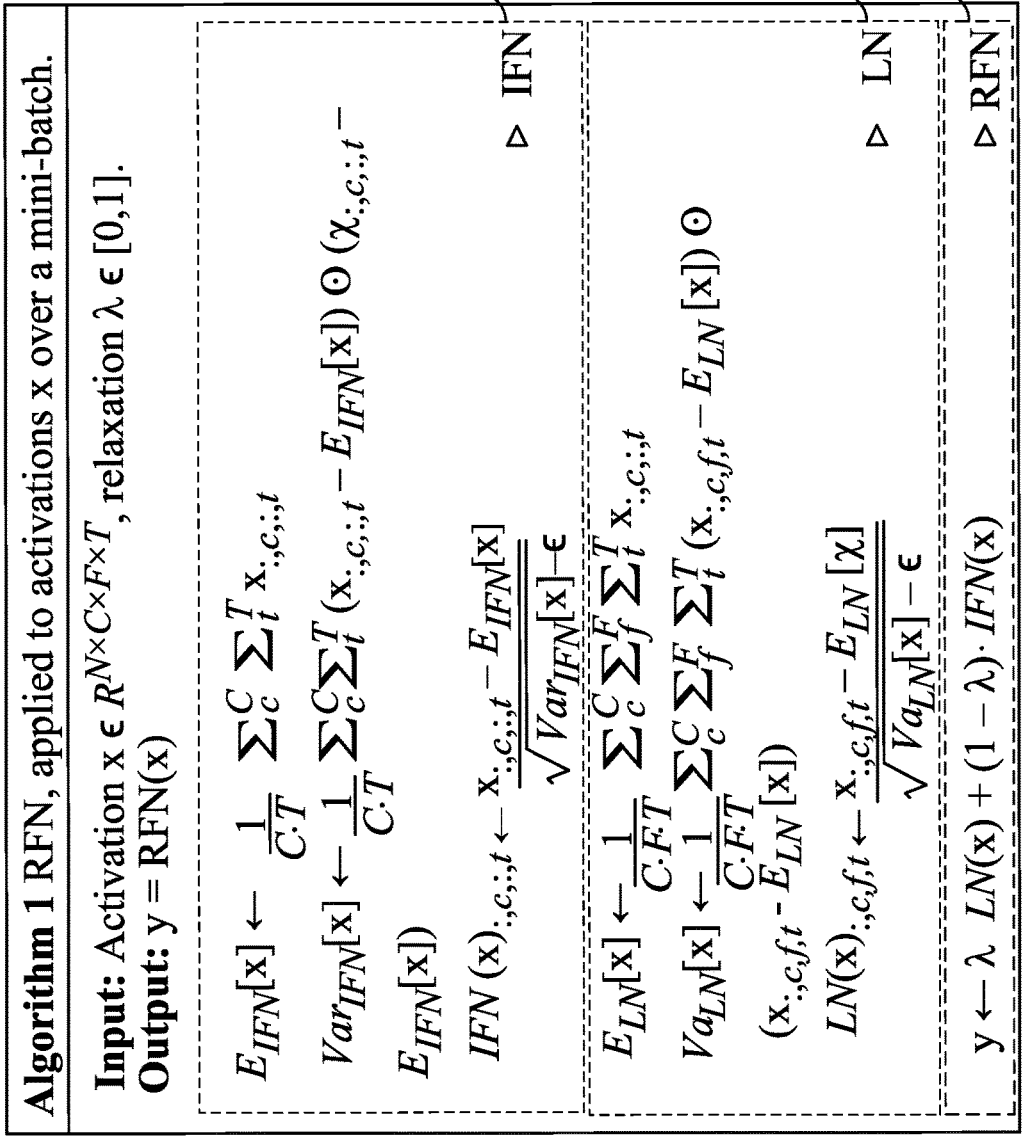
FIG. 4 depicts example pseudocode for an algorithm for processing audio using relaxed frequency normalization, according to aspects of the present disclosure.

FIG. 4 illustrates example pseudocode 400 for an algorithm that performs relaxed frequency normalization on an audio input.

In this example, the audio input may be normalized using instance frequency-wise normalization (IFN) 410 instead of IN for domain generalization of audio. Because frequency statistics are generally highly correlated to class-discriminative information, the use of additional features that are not normalized on a frequency basis may be used to relax the possible loss of useful information in normalizing audio data. To perform IFN 410, a mean and variance measure can be calculated to activations x over a batch of inputs in a multidimensional space, such as an audio input with data in the batch axis N, channel axis C, a frequency axis F, and a temporal axis T.

Instance-wise global statistics, represented as $S_i=\{k|kN=iN\}$, may be applied to an input using layer normalization (LN) 420. Using IFN 410 and LN 420, an output may be obtained using relaxed instance frequency-wise normalization (RFN) 430. In pseudocode 400, x is provided as input, and/∈ [0,1] represents the degree of relaxation applied to an input. In this example, the resulting mean and standard deviation of RFN (x) may be represented as:

$$\hat{\mu}_i^F = \frac{\lambda}{\sigma_i}(\mu_i^{(F)} - \mu_i) \quad (9)$$

and $$\hat{\sigma}_i^{(F)} = \lambda \cdot \frac{\sigma_i^{(F)}}{\sigma_i} + (1-\lambda) \quad (10)$$

respectively, where $\hat{\mu}_i^F$ and $\hat{\sigma}_i^{(F)}$ are calculated over $S_i=\{k|k_N=i_N,k_F=i_F\}$, and $u_i$ and $\sigma_i$ are statistics over $S_i=\{k|k_N=i_N\}$.

It should be recognized that other types of normalization may also or alternatively be combined with IFN 410 to perform RFN 430 of an input. For example, other normalization techniques like batch normalization, group normalization, or identity connection may be used in lieu of LN 420 illustrated in FIG. 4.

Figure 5A:
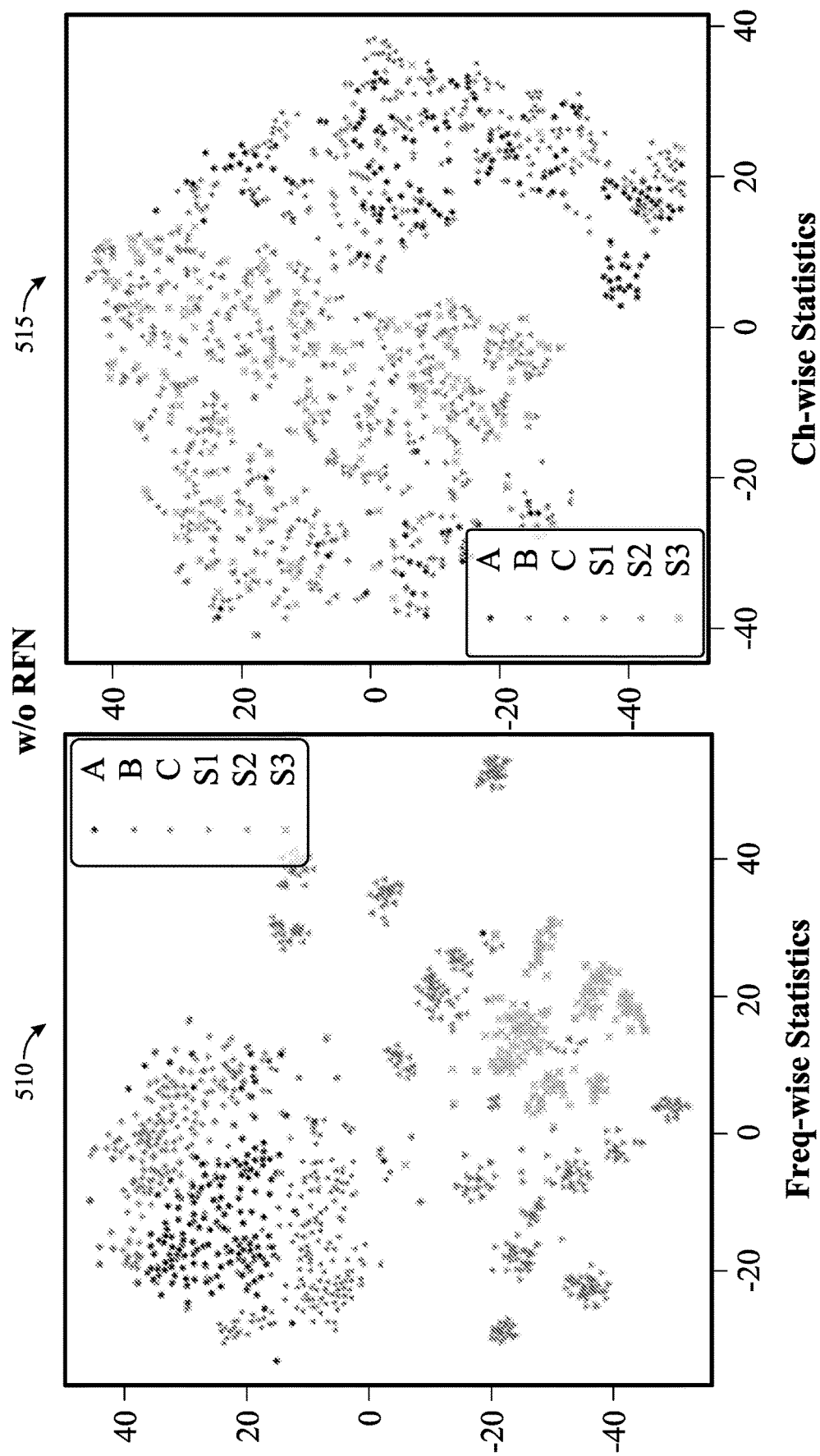
FIGS. 5A and 5B depict example scatter plots of audio classifications performed based on frequency-wise statistics and relaxed frequency normalizations, according to aspects of the present disclosure.
Figure 5B:
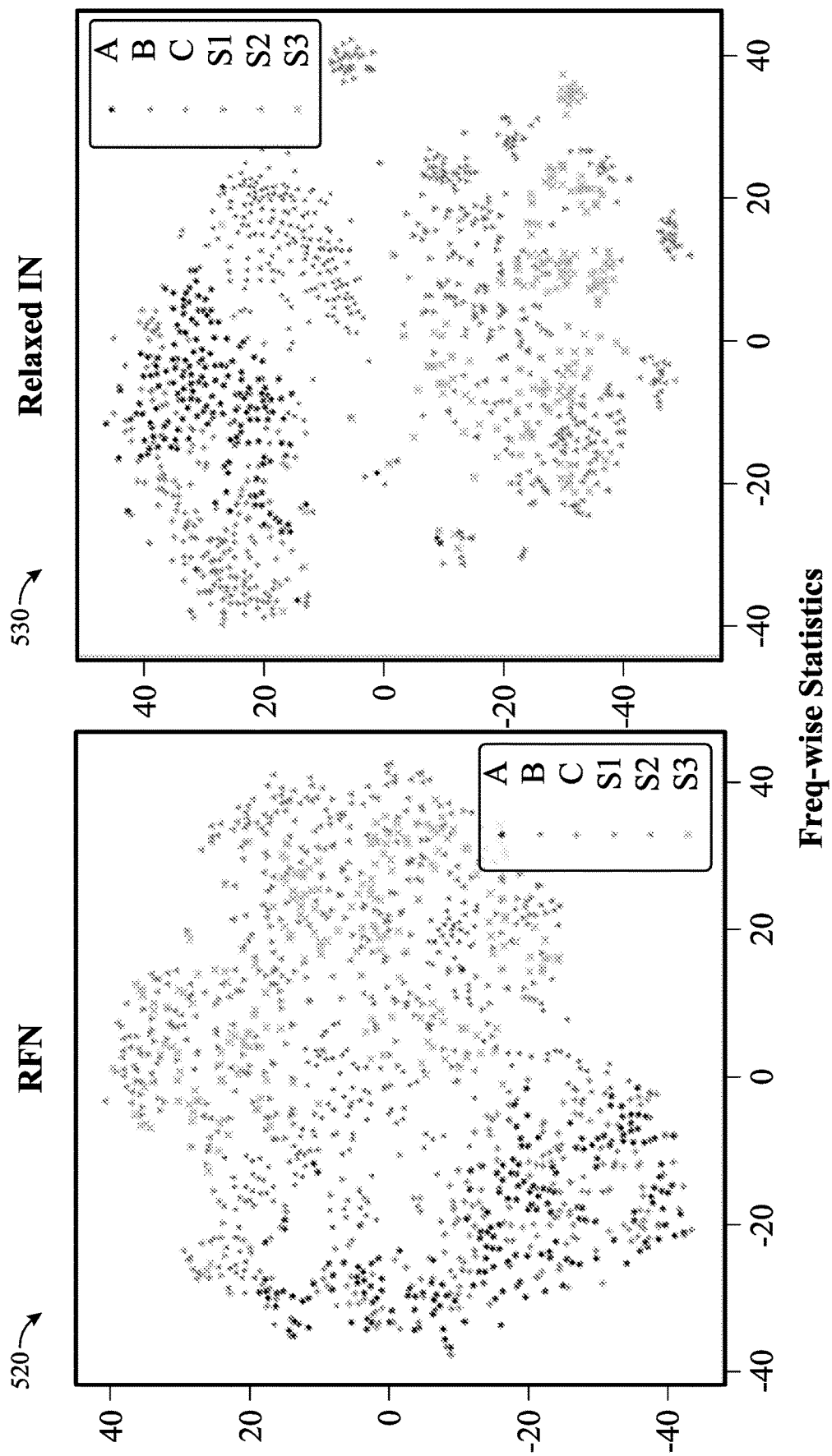

FIGS. 5A and 5B illustrate example scatter plots of audio classifications performed based on frequency-wise statistics and relaxed frequency normalizations. As illustrated, in scatter plot 510 in FIG. 5A, it can be seen that audio samples can be classified into a plurality of categories (e.g., corresponding to different device IDs) based on frequency-wise statistical measures (e.g., mean and standard deviation). Using channel-wise statistics, however, it may be seen in scatter plot 515 in FIG. 5A that the data from each of these categories may be commingled with each other such that data associated with one of a plurality of categories is not segregated from data associated with another category of the plurality of categories. Thus, as discussed above with respect to FIG. 1, it may be seen that frequency-wise statistics provide mutual information that can be used in performing various classifications of audio inputs.

With relaxed frequency normalization as illustrated in graph 520 in FIG. 5B, it may be seen that features from different devices are successfully mixed. Meanwhile, in relaxed instance normalization as illustrated in graph 530 in FIG. 5B, it may be seen features from different devices are also mixed. Thus, using the relaxation techniques discussed herein, domain-specific information may be suppressed or minimized, allowing for this extraneous information to be disregarded in performing audio classification tasks. Information pertinent to audio classification tasks may thus be used in training and inference operations without being influenced by extraneous information, resulting in the increased accuracy of audio classification tasks discussed above.

Figure 6:
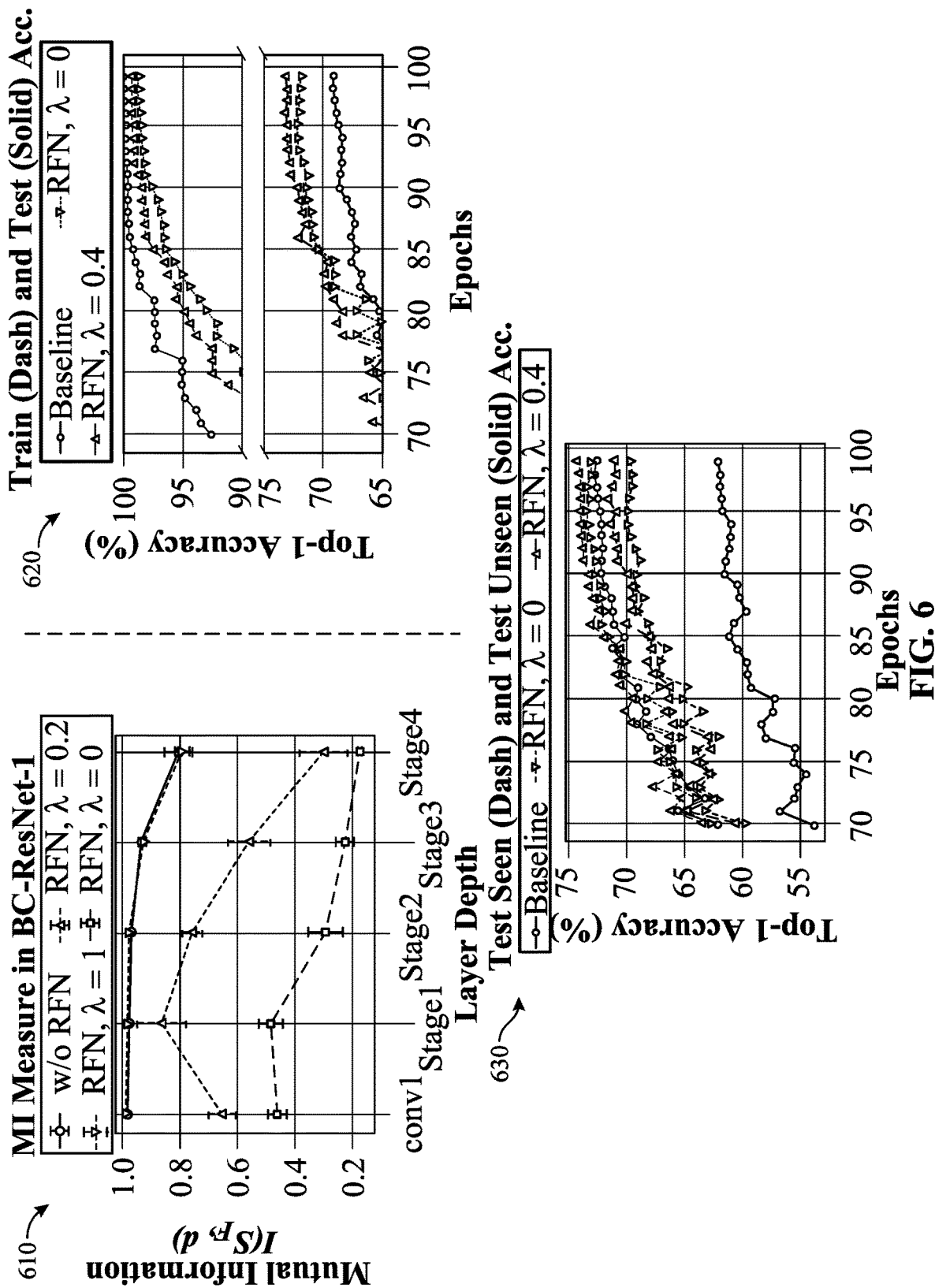
FIG. 6 depicts relationships between mutual information and training and testing accuracy for a neural network, according to aspects of the present disclosure.

FIG. 6 depicts relationships between mutual information and training and testing accuracy for a neural network for audio classification, according to aspects of the present disclosure. Mutual information measurements illustrated in graph 610 illustrates mutual information measured between different channels at each of a plurality of layers in a neural network. As illustrated in graph 610, mutual information in a data set may decrease with each layer of the neural network when no relaxation is applied (e.g., λ=0). However, with varying levels of relaxation (e.g., λ>0), it may be seen that the scale of mutual information decreases through different layers of a neural network may be reduced. For acoustic scene classification, the representative 2D audio features log-Mel spectrogram and MFCCs, are inputs. MI is then estimated after each stage, which is a sequence of convolutional blocks whose activations have the same width.

Reducing the scale of decreases in mutual information in a data set may thus result in increases in training and testing accuracy in a neural network for both domains that are included in a training data set and domains that are not included in the training data set. Generally, as illustrated in graph 620, the gap between training and testing accuracy may be largest in neural networks that are not trained using relaxed frequency normalization techniques, and this gap between training and testing accuracy may be seen with increasing amounts of relaxation applied to frequency normalization for an input data set. That is, relaxed frequency normalization, as discussed herein, allows for a smaller generalization loss than other normalization techniques.

Graph 630 illustrates testing accuracy for data from domains included in a training data set and unseen domains not included in the training data set. In graph 630, it may be seen that the classification accuracy for neural networks trained using normalization techniques other than relaxed frequency normalization is low, resulting in a significant gap between classification accuracy for data in domains that are included in the training data set and domains that are not included in the training data set (e.g., data from different recording devices than those used to record the data in the training data set, etc.). In contrast, neural networks trained using relaxed frequency normalization may show significant increases in inference accuracy, especially for data from unseen domains.

Generally, the neural networks described herein trained using relaxed frequency normalization of an input data set may allow for robust, accurate classification of audio inputs in various implementations. For example, in acoustic scene classification, in which relaxed frequency normalization is applied to an input and at the end of each stage (or layer) of a neural network, a neural network trained using relaxed frequency normalization may provide a significant increase (e.g., a five percent increase) in the accuracy of classifying seen and previously unseen audio inputs into the proper category relative to other normalizations applied to audio data. In a keyword spotting task in which a neural network is trained on a data set of speech commands and a plurality of speakers, the relaxed frequency normalization techniques discussed herein may allow for an increase in keyword identification accuracy for unseen speakers. These increases in keyword identification accuracy may be more significant where the neural network is trained using a small numbers of speakers from which the training data set was generated. In a speaker verification task, in which speakers are identified from a various of genres of speech (e.g., an interview, live speaking, entertainment, drama, etc.), speaker verification using neural networks trained using the relaxed frequency normalization techniques discussed herein may show decreased error rates relative to other techniques by which inputs are normalized in training a neural network.

Figure 7:
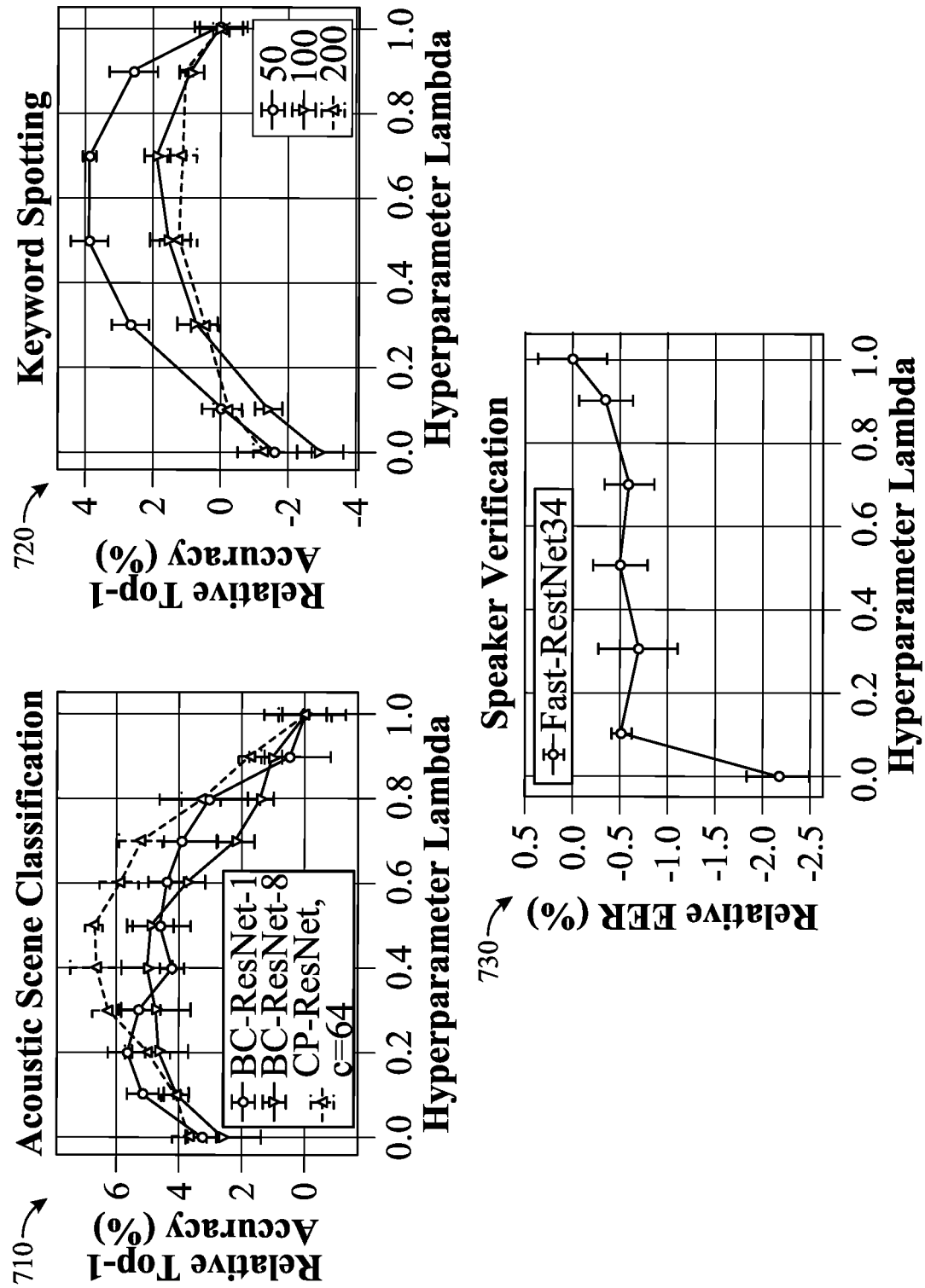
FIG. 7 depicts example accuracy of neural networks for various audio classification tasks in which relaxed frequency normalization is used in training and inference operations, according to aspects of the present disclosure.

FIG. 7 depicts example accuracy of neural networks for various audio classification tasks in which relaxed frequency normalization is used in training and inference operations.

Graph 710 illustrates the accuracy of neural networks for acoustic scene classification using various amounts of relaxation for the frequency normalization techniques discussed herein. As illustrated, for varying configurations of convolutional neural networks with varying numbers of layers, inference accuracy may increase up to a certain level of relaxation and may subsequently decrease. That is, the highest inference accuracy may be achieved for some value of $\lambda$ between 0 (frequency normalized, with no relaxation) and 1 (normalized using some technique other than frequency normalization). Similar performance may be seen in graph 720, which illustrates the accuracy of neural networks for keyword spotting tasks.

In speaker verification tasks, however, graph 730 illustrates an error rate for various levels of relaxation, relative to full relaxation (e.g., $\lambda=1$). As illustrated, decreases in error rates, relative to full relaxation, may be between 0 and 1 percent for values of $\lambda$ between 0 and 1. However, where no relaxation is applied, meaning that frequency normalization is applied to a training data set for a neural network and to input data for which the neural network is to infer the identity of the speaker, it may be seen that the decrease in error rate, relative to full relaxation, is over 2 percent. Thus, for speaker verification tasks, frequency normalization and no relaxation may be used to achieve highest inference accuracy.

Figure 8:
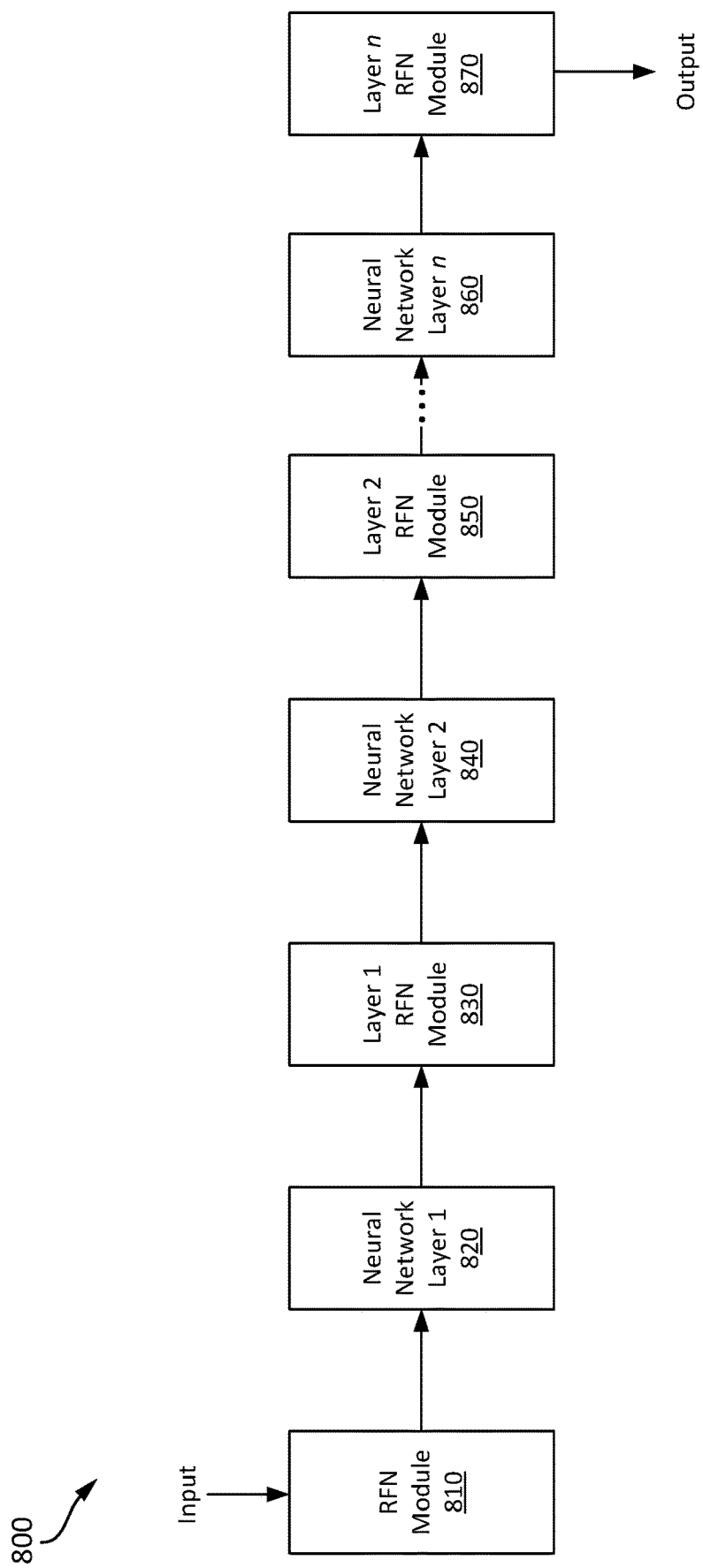
FIG. 8 depicts an example neural network pipeline in which relaxed frequency normalization modules are used to normalize data at a plurality of layers in a neural network, according to aspects of the present disclosure.

FIG. 8 illustrates one example in which relaxed frequency normalization modules are present in each of a plurality of stages of a pipeline 800 in a neural network. Relaxed frequency normalization may be used at any location in a neural network and may also be used in multiple locations in a neural network. In pipeline 800, an input may be processed in an initial RFN module 810. The output of initial RFN module 810 may be provided as input to neural network layer 1 820, the output of neural network layer 1 820 may be processed through layer 1 RFN module 830. At the next layer, layer 2, in the neural network, the output of the RFN module for the previous layer (e.g., layer 1 RFN module 830) may be provided as input into the next layer of the neural network (e.g., neural network layer 2 840). At layer 2, the output of the neural network layer 2 840 may be processed through a corresponding layer 2 RFN module 850. More generally, at the $n^{th}$ neural network layer, the output of the $n-1^{th}$ RFN module associated with the $n-1^{th}$ neural network layer may be provided as input to the $n^{th}$ neural network layer 860, and the output of the $n^{th}$ neural network layer 860 may be processed through a corresponding RFN module 870 for the $n^{th}$ neural network layer. However, while FIG. 8 illustrates a pipeline in which the input layer and each layer in the neural network include a corresponding RFN module, it should be recognized that RFN modules need not be associated with each layer in the neural network. For example, RFN modules may only be present at the input layer in a neural network, may be present in a sub-set of the layers in the neural network, or the like. Relative to non-frequency-normalized data, applying relaxed frequency normalization modules at the input stage of a neural network may have the highest impact in increasing the accuracy of a neural network. Additional (though smaller) increases in performance may be seen as relaxed frequency normalization modules are attached to subsequent layers in the neural network.

Relaxed frequency normalization is generally an explicit normalization of data. It should be noted that the use of relaxed frequency normalization need not be a standalone technique for normalizing audio data in training a neural network to perform audio classification tasks and in performing audio classification tasks based on a normalized input. For example, relaxed frequency normalization may be combined with cross-gradient training, in which gradient descent is used in training a neural network using multi-domain data sets, and/or canonical signed digit (CSD) multipliers to achieve additional improvements in inference accuracy.

Figure 9:
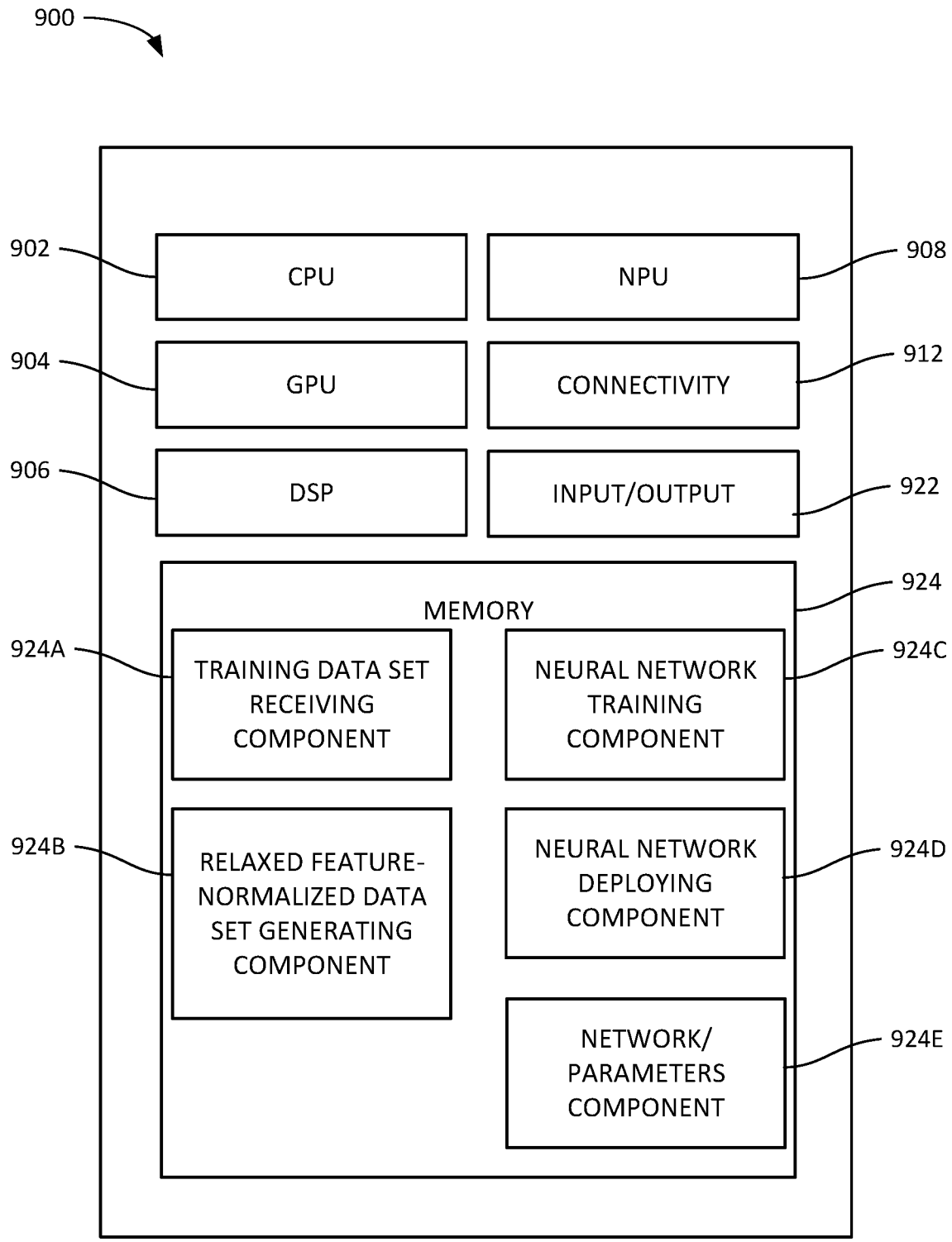
FIG. 9 depicts an example implementation of a processing system on which a neural network is trained to perform audio classification based on a relaxed frequency-normalized training data set, according to aspects of the present disclosure.

Example Processing Systems for Audio Classification Using Neural Networks and Relaxed Frequency Normalization FIG. 9 depicts an example processing system 900 for training a neural network to classify audio into one of a plurality of categories using neural networks and relaxed frequency normalization, such as described herein for example with respect to FIG. 2.

Processing system 900 includes a central processing unit (CPU) 902, which in some examples may be a multi-core CPU. Instructions executed at the CPU 902 may be loaded, for example, from a program memory associated with the CPU 902 or may be loaded from a memory partition (e.g., of memory 924).

Processing system 900 also includes additional processing components tailored to specific functions, such as a graphics processing unit (GPU) 904, a digital signal processor (DSP) 906, a neural processing unit (NPU) 908, and a connectivity component 912.

An NPU, such as NPU 908, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPU 908, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 908 is a part of one or more of CPU 902, GPU 904, and/or DSP 906.

In some examples, connectivity component 912 may include subcomponents, for example, for third generation (3G) connectivity, fourth generation (5G) connectivity (e.g., 5G LTE), fifth generation connectivity (e.g., 5G or NR), Wi-Fi connectivity, Bluetooth connectivity, and other wireless data transmission standards. Connectivity component 912 may be further connected to one or more antennas (not shown).

In some examples, one or more of the processors of processing system 900 may be based on an ARM or RISC-V instruction set.

Processing system 900 also includes memory 924, which is representative of one or more static and/or dynamic memories, such as a dynamic random access memory, a flash-based static memory, and the like. In this example, memory 924 includes computer-executable components, which may be executed by one or more of the aforementioned processors of processing system 900.

In particular, in this example, memory 924 includes training data set receiving component 924A, relaxed feature-normalized data set generating component 924B, neural network training component 924C, neural network deploying component 924D, and network/parameters component 924E. The depicted components, and others not depicted, may be configured to perform various aspects of the methods described herein.

Generally, processing system 900 and/or components thereof may be configured to perform the methods described herein.

Figure 10:
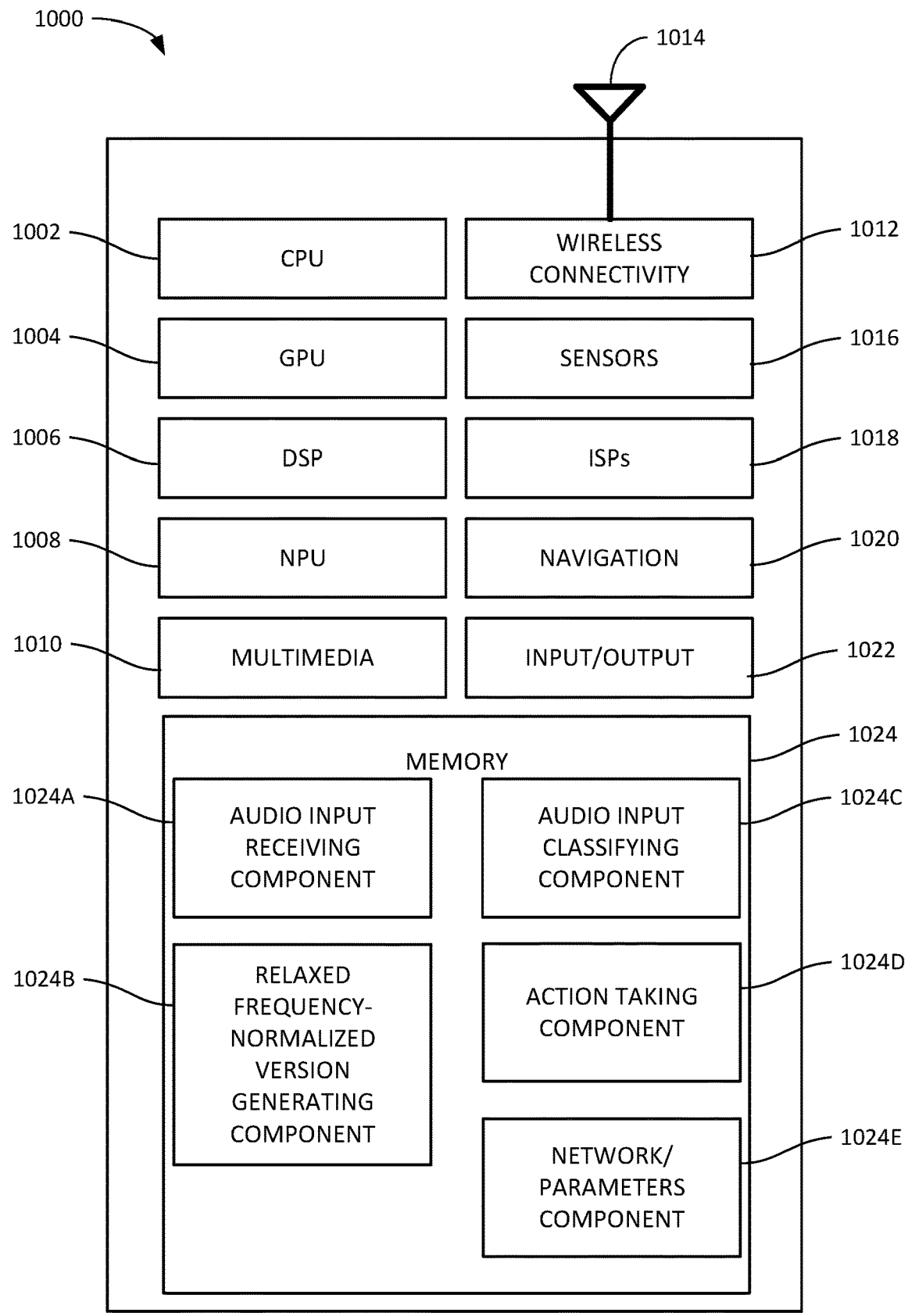
FIG. 10 depicts an example implementation of a processing system on which audio classification using neural networks and relaxed frequency normalization can be performed, according to aspects of the present disclosure.

FIG. 10 depicts an example processing system 1000 for audio input classification using neural networks and relaxed frequency normalization, such as described herein for example with respect to FIG. 3.

Processing system 1000 includes a central processing unit (CPU) 1002 and may include additional processing components tailored to specific functions, such as a graphics processing unit (GPU) 1004, a digital signal processor (DSP) 1006, a neural processing unit (NPU) 1008, a multimedia processing unit 1010, and a wireless connectivity component 1012. CPU 1002, GPU 1004, DSP 1006, and NPU 1008 may be similar to CPU 902, GPU 904, DSP 906, and NPU 908 discussed above with respect to FIG. 9.

In some examples, wireless connectivity component 1012 may include subcomponents, for example, for third generation (3G) connectivity, fourth generation (5G) connectivity (e.g., 5G LTE), fifth generation connectivity (e.g., 5G or NR), Wi-Fi connectivity, Bluetooth connectivity, and other wireless data transmission standards. Wireless connectivity component 1012 is further connected to one or more antennas 1014.

Processing system 1000 may also include one or more sensor processing units 1016 associated with any manner of sensor, one or more image signal processors (ISPs) 1018 associated with any manner of image sensor, and/or a navigation processor 1020, which may include satellite-based positioning system components (e.g., GPS or GLONASS) as well as inertial positioning system components.

Processing system 1000 may also include one or more input and/or output devices 1022, such as screens, touch-sensitive surfaces (including touch-sensitive displays), physical buttons, speakers, microphones, and the like.

In some examples, one or more of the processors of processing system 1000 may be based on an ARM or RISC-V instruction set.

Processing system 1000 also includes memory 1024, which is representative of one or more static and/or dynamic memories, such as a dynamic random access memory, a flash-based static memory, and the like. In this example, memory 1024 includes computer-executable components, which may be executed by one or more of the aforementioned processors of processing system 1000.

In particular, in this example, memory 1024 includes audio input receiving component 1024A, relaxed frequency-normalized version generating component 1024B, audio input classifying component 1024C, action taking component 1024D, and network/parameters component 1024E. The depicted components, and others not depicted, may be configured to perform various aspects of the methods described herein.

Generally, processing system 1000 and/or components thereof may be configured to perform the methods described herein.

Notably, in other aspects, features of processing system 1000 may be omitted, such as where processing system 1000 is a server computer or the like. For example, multimedia processing unit 1010, wireless connectivity component 1012, sensor processing units 1016, ISPs 1018, and/or navigation processor 1020 may be omitted in other aspects. Further, aspects of processing system 1000 may be distributed, such as training a model and using the model to generate inferences, such as user verification predictions.

Example Clauses

Clause 1: A method, comprising: receiving a data set including a plurality of audio samples; generating a relaxed frequency-normalized data set by normalizing each audio sample of the plurality of audio samples; training a neural network to classify audio into one of a plurality of categories based on the relaxed frequency-normalized data set; and deploying the trained neural network.

Clause 2: The method of Clause 1, wherein generating the relaxed frequency-normalized data set comprises: calculating one or more statistical measures for one or more hidden features in each of a plurality of feature dimensions in the plurality of audio samples; and generating an instance-frequency-normalized version of each audio sample of the plurality of audio samples based on the calculated one or more statistical measures.

Clause 3: The method of Clause 2, wherein the plurality of feature dimensions comprise a batch dimension, a channel dimension, a frequency dimension, and a temporal dimension.

Clause 4: The method of Clause 2 or 3, wherein the one or more statistical measures comprise: a frequency-wise mean across the plurality of audio samples, and a frequency-wise standard deviation across the plurality of audio samples.

Clause 5: The method of any of Clauses 2 through 4, wherein generating the relaxed frequency-normalized data set further comprises further normalizing each audio sample of the plurality of audio samples based on layer normalization using one or more statistical measures generated over the received data set.

Clause 6: The method of Clause 5, wherein further normalizing each audio sample of the plurality of audio samples is further based on a relaxation factor associated with a degree of relaxation to apply to each instance-frequency-normalized audio sample of the plurality of audio samples.

Clause 7: The method of Clause 5 or 6, wherein further normalizing each audio sample of the plurality of audio samples comprises: generating, for each audio sample, a layer-normalized representation of the audio sample; and generating a relaxed frequency-normalized representation of the audio sample based on a layer normalization relaxation factor, the layer-normalized representation of the audio sample, a difference between 1 and the layer normalization relaxation factor, and the instance-frequency-normalized version of the audio sample.

Clause 8: The method of any of Clauses 2 through 7, wherein generating the relaxed frequency-normalized data set further comprises: generating, for each audio sample, a batch-normalized representation of the audio sample; and generating a relaxed frequency-normalized representation of the audio sample based on a batch normalization relaxation factor, the batch-normalized representation of the audio sample, a difference between 1 and the batch normalization relaxation factor, and an instance-frequency-normalized version of the audio sample.

Clause 9: A method, comprising: receiving an audio input; generating a relaxed frequency-normalized version of the audio input; generating a classification of the received audio input using the relaxed frequency-normalized version of the audio input and a neural network trained to classify audio into one of a plurality of categories; and taking one or more actions based on the classification of the received audio input.

Clause 10: The method of Clause 9, wherein generating the relaxed frequency-normalized version of the audio input comprises: calculating one or more statistical measures for one or more hidden features in each of a plurality of feature dimensions in the received audio input; and generating an instance-frequency-normalized version of the received audio input based on the calculated one or more statistical measures.

Clause 11: The method of Clause 10, wherein the plurality of feature dimensions comprise a batch dimension, a channel dimension, a frequency dimension, and a temporal dimension.

Clause 12: The method of Clause 10 or 11, wherein the one or more statistical measures comprise: a frequency-wise mean across the received audio input, and a frequency-wise standard deviation across the received audio input.

Clause 13: The method of any of Clauses 10 through 12, wherein generating the relaxed frequency-normalized version of the received audio input further comprises further normalizing the received audio input based on layer normalization using one or more statistical measures generated over each of a plurality of portions of the received audio input.

Clause 14: The method of Clause 13, wherein further normalizing the received audio input is further based on a relaxation factor associated with a degree of relaxation to apply to the normalized received audio input.

Clause 15: The method of Clause 13 or 14, wherein further normalizing the received audio input comprises: generating a layer-normalized representation of the received audio input; and generating a relaxed frequency-normalized representation of the received audio input based on a layer normalization relaxation factor, the layer-normalized representation of the received audio input, a difference between 1 and the layer normalization relaxation factor, and the instance-frequency-normalized version of the received audio input.

Clause 16: The method of any of Clauses 10 through 15, wherein generating the relaxed frequency-normalized version of the received audio input comprises: generating a batch-normalized representation of the received audio input; and generating a relaxed frequency-normalized representation of the received audio input based on a batch normalization relaxation factor, the batch-normalized representation of the received audio input, a difference between 1 and the batch normalization relaxation factor, and an instance-frequency-normalized version of the received audio input.

Clause 17: The method of any of Clauses 9 through 16, wherein the neural network comprises a plurality of layers and one or more relaxed frequency normalization modules.

Clause 18: The method of any of Clauses 9 through 17, wherein the neural network comprises a model for classifying audio input into one of a plurality of audio scene classifications.

Clause 19: The method of any of Clauses 9 through 18, wherein the neural network comprises a model for classifying audio input into one of a plurality of categories associated with defined keywords for tasks in a computing system.

Clause 20: The method of any of Clauses 9 through 19, wherein the neural network comprises a model for identifying a speaker recorded in an audio input.

Clause 21: The method of any of Clauses 9 through 20, wherein the neural network comprises a two-dimensional convolutional neural network.

Clause 22: A processing system, comprising: a memory comprising computer-executable instructions; and one or more processors configured to execute the computer-executable instructions and cause the processing system to perform a method in accordance with any of Clauses 1-21.

Clause 23: A processing system, comprising means for performing a method in accordance with any of Clauses 1-21.

Clause 24: A non-transitory computer-readable medium comprising computer-executable instructions that, when executed by one or more processors of a processing system, cause the processing system to perform a method in accordance with any of Clauses 1-21.

Clause 25: A computer program product embodied on a computer-readable storage medium comprising code for performing a method in accordance with any of Clauses 1-21.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method comprising:
   receiving an audio input;
   generating a relaxed frequency-normalized version of the audio input comprises:
   calculating one or more statistical measures for one or more hidden features in each of a plurality of feature dimensions in the received audio input; and
   generating an instance-frequency-normalized version of the received audio input based on the calculated one or more statistical measures;
   generating a classification of the received audio input using the relaxed frequency-normalized version of the audio input and a neural network trained to classify audio into one of a plurality of categories; and
   taking one or more actions based on the classification of the received audio input.

2. The method of claim 1, wherein the plurality of feature dimensions comprise a batch dimension, a channel dimension, a frequency dimension, and a temporal dimension.

3. The method of claim 1, wherein the one or more statistical measures comprise:
   a frequency-wise mean across the received audio input, and
   a frequency-wise standard deviation across the received audio input.

4. The method of claim 1, wherein generating the relaxed frequency-normalized version of the received audio input comprises:
   generating a batch-normalized representation of the received audio input; and
   generating a relaxed frequency-normalized representation of the received audio input based on a batch normalization relaxation factor, the batch-normalized representation of the received audio input, a difference between 1 and the batch normalization relaxation factor, and the instance-frequency-normalized version of the received audio input.

5. The method of claim 1, wherein the neural network comprises a plurality of layers and one or more relaxed frequency-normalization modules.

6. The method of claim 1, wherein the neural network comprises a model for classifying the audio input into one of a plurality of audio scene classifications.

7. The method of claim 1, wherein the neural network comprises a model for classifying the audio input into the one of the plurality of categories associated with defined keywords for tasks in a computing system.

8. The method of claim 1, wherein the neural network comprises a model for identifying a speaker recorded in the audio input.

9. The method of claim 1, wherein the neural network comprises a two-dimensional convolutional neural network.

10. The method of claim 1, wherein generating the relaxed frequency-normalized version of the received audio input further comprises normalizing the received audio input based on layer normalization using one or more statistical measures generated over each of a plurality of portions of the received audio input.

11. The method of claim 10, wherein normalizing the received audio input is further based on a relaxation factor associated with a degree of relaxation to apply to the normalized received audio input.

12. The method of claim 10, wherein normalizing the received audio input comprises:
generating a layer-normalized representation of the received audio input; and
generating a relaxed frequency-normalized representation of the received audio input based on a layer normalization relaxation factor, the layer-normalized representation of the received audio input, a difference between 1 and the layer normalization relaxation factor, and the instance-frequency-normalized version of the received audio input.

13. A processor-implemented method comprising:
receiving a data set including a plurality of audio samples;
by normalizing each audio sample of the plurality of audio samples generating a relaxed frequency-normalized data set that comprises:
calculating one or more statistical measures for one or more hidden features in each of a plurality of feature dimensions in the plurality of audio samples; and
generating an instance-frequency-normalized version of each audio sample of the plurality of audio samples based on the calculated one or more statistical measures;
training a neural network to classify audio into one of a plurality of categories based on the relaxed frequency-normalized data set; and
deploying the trained neural network.

14. The method of claim 13, wherein the plurality of feature dimensions comprise a batch dimension, a channel dimension, a frequency dimension, and a temporal dimension.

15. The method of claim 13, wherein the one or more statistical measures comprise:
a frequency-wise mean across the plurality of audio samples, and
a frequency-wise standard deviation across the plurality of audio samples.

16. The method of claim 13, wherein generating the relaxed frequency-normalized data set further comprises:
generating, for each audio sample, a batch-normalized representation of the audio sample; and
generating a relaxed frequency-normalized representation of the audio sample based on a batch normalization relaxation factor, the batch-normalized representation of the audio sample, a difference between 1 and the batch normalization relaxation factor, and the instance-frequency-normalized version of the audio sample.

17. The method of claim 13, wherein generating the relaxed frequency-normalized data set further comprises further normalizing each audio sample of the plurality of audio samples based on layer normalization using one or more statistical measures generated over the received data set.

18. The method of claim 17, wherein further normalizing each audio sample of the plurality of audio samples is further based on a relaxation factor associated with a degree of relaxation to apply to each instance-frequency-normalized version of each audio sample of the plurality of audio samples.

19. The method of claim 17, wherein further normalizing each audio sample of the plurality of audio samples comprises:
generating, for each audio sample, a layer-normalized representation of the audio sample; and
generating a relaxed frequency-normalized representation of the audio sample based on a layer normalization relaxation factor, the layer-normalized representation of the audio sample, a difference between 1 and the layer normalization relaxation factor, and the instance-frequency-normalized version of the audio sample.

20. A processing system comprising:
a memory comprising computer-executable instructions; and
one or more processors configured to execute the computer-executable instructions and cause the processing system to:
receive a data set including a plurality of audio samples;
generate a relaxed frequency-normalized data set by normalization of each audio sample of the plurality of audio samples that comprises:
calculate one or more statistical measures for one or more hidden features in each of a plurality of feature dimensions in the received audio input; and
generate an instance-frequency-normalized version of the received audio input based on the calculated one or more statistical measures;
train a neural network to classify audio into one of a plurality of categories based on the relaxed frequency-normalized data set; and
deploy the trained neural network.

21. A processing system comprising:
a memory comprising computer-executable instructions; and
one or more processors configured to execute the computer-executable instructions and cause the processing system to:
receive an audio input;
generate a relaxed frequency-normalized version of the audio input that comprises:
calculate one or more statistical measures for one or more hidden features in each of a plurality of feature dimensions in the received audio input; and
generate an instance-frequency-normalized version of the received audio input based on the calculated one or more statistical measures;
generate a classification of the received audio input using a neural network trained to classify audio into one of a plurality of categories and the relaxed frequency-normalized version of the audio input; and
take one or more actions based on the classification of the received audio input.

22. The system of claim 21, wherein the plurality of feature dimensions comprise a batch dimension, a channel dimension, a frequency dimension, and a temporal dimension.

23. The system of claim 21, wherein the one or more statistical measures comprise:
a frequency-wise mean across the received audio input, and
a frequency-wise standard deviation across the received audio input.

24. The system of claim 21, wherein the generate the relaxed frequency-normalized version of the received audio input further comprises further normalization of the received audio input based on layer normalization using one or more statistical measures generated over each of a plurality of portions of the received audio input.

25. The system of claim 21, wherein the further normalization of the received audio input is further based on a relaxation factor associated with a degree of relaxation to apply to the normalized received audio input.

26. The system of claim 21, wherein the generate the relaxed frequency-normalized version of the received audio input comprises:
   generate a batch-normalized representation of the received audio input; and
   generate a relaxed frequency-normalized representation of the received audio input based on a batch normalization relaxation factor, the batch-normalized representation of the received audio input, a difference between 1 and the batch normalization relaxation factor, and the instance-frequency-normalized version of the received audio input.

27. The system of claim 21, wherein the neural network comprises a plurality of layers and one or more relaxed frequency-normalization modules.

\* \* \* \* \*